US005099956A

United States Patent [19]

Curran

[11] Patent Number: 5,099,956

[45] Date of Patent: Mar. 31, 1992

[54] PLATE FOR ADJUSTING THE WHEELS OF A VEHICLE

[75] Inventor: Robert J. Curran, Mississauga, Canada

[73] Assignee: Derlan Manufacturing Inc., Canada

[21] Appl. No.: 513,390

[22] Filed: Apr. 23, 1990

[51] Int. Cl.[5] .................. B60S 13/00

[52] U.S. Cl. .................. 187/8.41; 187/8.77; 248/349

[58] Field of Search .................. 187/8.41, 8.45, 8.71, 187/18, 8.77; 248/558, 349, 346, 678; 254/122, 22, 38

[56] References Cited

U.S. PATENT DOCUMENTS

| | | | |
|---|---|---|---|
| 2,648,139 | 8/1953 | Wilkenson | 248/349 |
| 3,159,371 | 12/1964 | Weissenberg | 248/346 |
| 3,479,632 | 11/1969 | Gallas | 248/349 |
| 4,501,342 | 2/1985 | Murphy | 187/8.41 |

OTHER PUBLICATIONS

Space Saver 9000 Installation Operation and Parts Manual.

*Primary Examiner*—Robert P. Olszewski
*Assistant Examiner*—Kenneth Noland
*Attorney, Agent, or Firm*—Rogers, Bereskin & Parr

[57] ABSTRACT

A plate, for use in adjusting the rear wheels of a four wheel vehicle incorporating all wheel steering has an elongate sheet-form bearing cage, which includes a plurality of apertures. Ball bearings or other rolling elements are located in the apertures, and a top sheet member is located on top of the ball bearings. In use, the ball bearings are supported on a horizontal planar surface, for example a support platform of a hydraulic lift or a separate base sheet member. The configuration of the cage and the bearings is such that the top sheet member is capable of limited lateral and rotational movement in a horizontal plane, to permit full adjustment of rear wheels of a vehicle having a steering capacity.

19 Claims, 3 Drawing Sheets

PLATE FOR ADJUSTING THE WHEELS OF A VEHICLE

FIELD OF THE INVENTION

This invention relates to a plate which enables the alignment of steerable wheels of a vehicle to be checked. More particularly, this invention relates to a plate for use with the rear wheels of a vehicle, which incorporates rear wheel steering.

BACKGROUND OF THE INVENTION

For conventional automobiles with just front wheel steering, it is known to provide so-called rear steer plates on lifts and the like for lifting the vehicle, or possibly independently of the lift for use on a level surface. At the front, for the steering wheels, it is usual to provide a steer plate which is mounted on a circle of ball bearings for rotation about a vertical axis. Further, this front plate is capable of some limited lateral movement. This then enables all aspects of the front wheel alignment of a vehicle to be checked.

For conventional automobiles, the rear wheels have no steering function, and hence alteration to the rear wheel alignment is usually a minor consideration. Nonetheless, it is known to provide slide plates, which are mounted on long, thin rollers. The rollers extend parallel to the longitudinal axis of the vehicle, so as to permit the side plates to move from side to side. This enables the camber of the rear wheels to be adjusted if desired.

More recently, cars or automobiles have been introduced which incorporate four wheel steering. For these vehicles, the front wheels provide the main steering function, but in some circumstances additional steering is provided by the rear wheels.

As a result, more attention has to be paid to checking the alignment of the rear wheels. In particular, both the camber and toe in angles of the rear wheels may need to be adjusted. Accordingly, it is desirable to provide a rear steering plate, which is capable of both rotational as well as lateral movement.

Steering plates may be provided either individually, or in conjunction with an hydraulic lift. An example, of an hydraulic lift is shown in U.S. Pat. No. 4,724,930, assigned to the same assignee as the present invention. The contents of this earlier U.S. Pat. No. 4,724,930 are hereby incorporated by reference.

SUMMARY OF THE PRESENT INVENTION

In accordance with the present invention, there is provided a plate, for use in adjusting the rear wheels of a four wheel vehicle incorporating all wheel steering and, either for mounting on a vehicle lift or mounting independently, the plate comprising an elongate sheet-form bearing cage including a plurality of apertures which are spaced apart both along the length and across the width of the bearing cage, a plurality of rolling elements for said apertures, with each aperture including at least one rolling element and the rolling elements having a diameter greater than the thickness of the bearing cage, a sheet member located on top of the rolling elements for supporting a vehicle wheel, and means for securing the sheet member to a generally horizontal planar support surface whilst permitting restricted horizontal movement thereof, whereby, in use, with the sheet member so secured to a planar surface, the sheet member is supported on the planar surface by said rolling elements and is capable of limited lateral and rotational movement in a horizontal plane.

The rolling elements can be ball bearings or any other suitable rolling elements, e.g. rollers.

The plate of the present invention may be incorporated into a lift, such as that described in U.S. Pat. No. 4,724,930. It will be appreciated that the exact characteristics of the lift are immaterial to the present invention, and the plate could be incorporated in any type of lift. Thus, for example, the lift need not necessarily have two separate scissor units as described in that U.S. patent. When incorporated into such a lift, the planar surface will be provided by a top surface of the lift itself.

The present invention also provides plates which can be used independently of any vehicle lifting device. In this case, the plate incorporates a planar base member which is located beneath the cage and the ball bearings, and is secured to the sheet member. The planar base member is then simply placed on any suitable flat surface, e.g. the floor of a workshop. The vehicle is then driven onto the plate.

It is noted that the present invention will be usually used in conjunction with conventional plates for use in adjusting the front wheels of the vehicle. In the case of a lift, both these conventional front plates, and plates in accordance with the present invention would be incorporated into the structure of the lift itself.

BRIEF DESCRIPTION OF THE DRAWING FIGURES

For a better understanding of the present invention and to show more clearly how it may be carried into effect, reference now be made by way of example to the accompanying drawings, in which.

DESCRIPTION OF THE PREFERRED EMBODIMENTS

Figure 1:
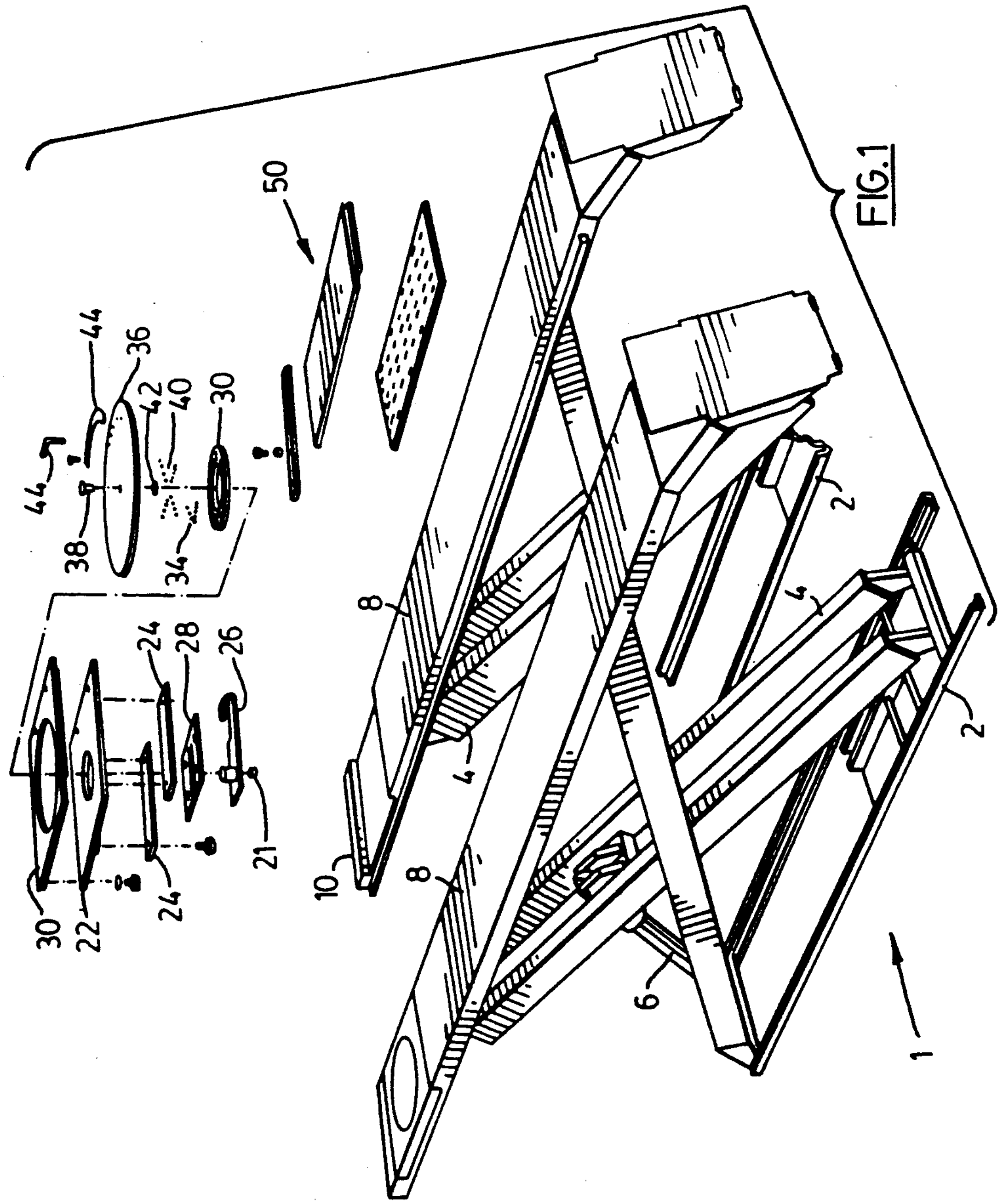
FIG. 1 is a perspective view of a lift incorporating conventional front plates and rear plates in accordance with the present invention, the plates being shown in an exploded view on one side thereof.

Referring first to FIG. 1, there is shown a hydraulic lift generally indicated by the reference 1. By way of example, this hydraulic lift is similar to that shown in the assignees earlier U.S. Pat. No. 4,724,930. But, the present invention could be used with any suitable hydraulic lift.

The hydraulic lift 1 has a pair of base frames 2, with a scissor unit 4 on each of the base frames 2. Each scissor unit 4 has a respective hydraulic activating cylinder 6. Support platforms 8 are mounted on top of the scissor units 4, so that they can be raised and lowered, by operation of the hydraulic actuators 6.

For the front, each support platform 8 includes a well or recess 10. The well or recess 10 is formed by a metal sheet 12 that extends out sideways. Within this recess 10, there is a front alignment plate 20. The front alignment plate 20 can be of conventional design, and an outline of its construction follows.

A first plate member 22 is mounted on a pair of elongate strip members 24 to the bottom of the respective recess 10, the member 22 being secured by bolts in known manner. A pointer 26 is held in position by a pointer retainer plate 28, the pointer 26 being free for rotational movement about an axis.

An upper plate member 30 is located on the first plate member 22 and has a relatively large opening in which are located a bearing cage 32 with ball bearings 34. The first plate member 32 has a smaller opening than the plate member 30, and provides a support surface for the ball bearings. A wheel support plate 36 is circular and is mounted by a bolt 38 to the pointer 20. A set of springs 40 and a spring retainer ring 42 are provided for biasing the support plate 36 to a central position. A scale 44 is secured to one edge of the plate 36. A locking pin 44 is provided for locking the wheels for plate 36 in position.

At the rear of each support platform, there is the rear wheel alignment plate 50 in accordance with the present invention. As for the front alignment plate 20, one of these rear plates 50 is shown in exploded view, and the description that follows is in relation to just one of the plates 50.

Conventionally, it is known to provide simple, slide plates for the rear wheels, which incorporate thin, longitudinal rods extending parallel to the length of the support platforms 8 and arrange side by side in a cage, to permit sideways movement of a supporting plate. Such an arrangement does not permit any rotational movement of an upper sheet member, and hence is unsuitable for adjusting any wheel having a steering function.

Referring now to the drawings, the rear wheel alignment plate 50 according to the present invention comprises a bearing cage 52 and a top sheet member 54.

The bearing cage 52 is located on top of a respective support platform 8. The bearing cage 52 is elongate and generally rectangular, and formed from an ultra high molecular weight plastic. The bearing cage 52 includes a plurality of apertures 56. Each aperture is elongate with rounded ends, for receiving ball bearings. In the preferred embodiment, each aperture is dimensioned to closely received 5 ball bearings. Thus, the overall length is five times the diameter of the balls and the width equal to the diameter of the balls, with an appropriate allowance for tolerances.

The apertures 56 are arranged in longitudinal and transverse rows. As indicated at 58, there is a first set of transverse rows of apertures 56, with each row having an aperture closer to the lower side of the bearing cage 52, as viewed in FIG. 2. Correspondingly, a second set 60 of the transverse rows has the apertures 56 evenly spaced apart in each row, with each row having an aperture closer to the upper side of the bearing cage 52.

These are five of the first rows 58 and four of the second rows 60. The rows 58, 60 are uniformly spaced, in the longitudinal direction, except for the pair of rows 58, 60 at one end, as shown in the partial section of FIG. 2. This pair of rows has a spacing half that of each other pair of adjacent rows. The result of this configuration is that the bearing cage 52 is asymmetrical about both its longitudinal and transverse axes. Consequently, turning about either of these axes, or both axes, will bring nearly all the apertures 56 adjacent different areas of the support platform 8 and top sheet member 54, i.e., areas not previously adjacent any aperture 56. (There are some exceptions; a simple turn about a transverse axes will cause the apertures of the two end rows 58 to switch places with one another).

As wear and dirt contamination is a problem with these type of devices, this provides a significant advantage. Such plates are routinely disassembled, cleared and packed with fresh lubricant. Periodically, one can now move the position of the rolling elements, when the planar surfaces show signs of wear, to ensure smooth apertures of the plate.

Figure 3:
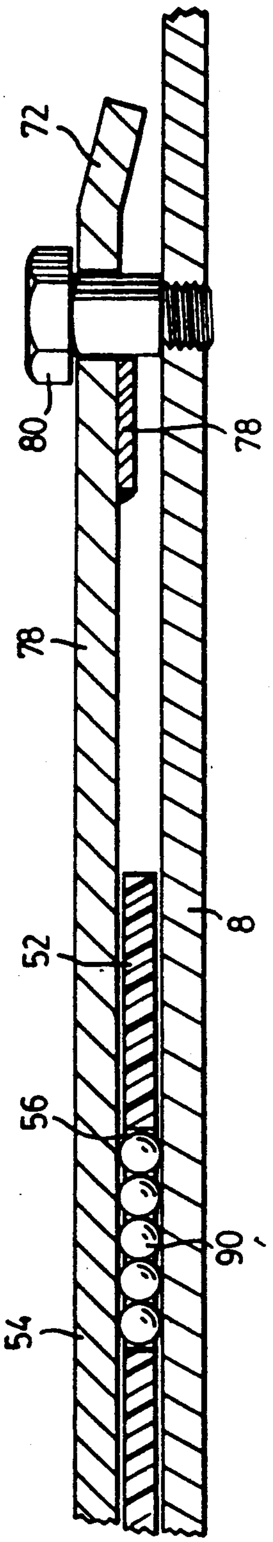
FIG. 3 is a vertical section along line 3—3 of FIG. 2.
Figure 4:
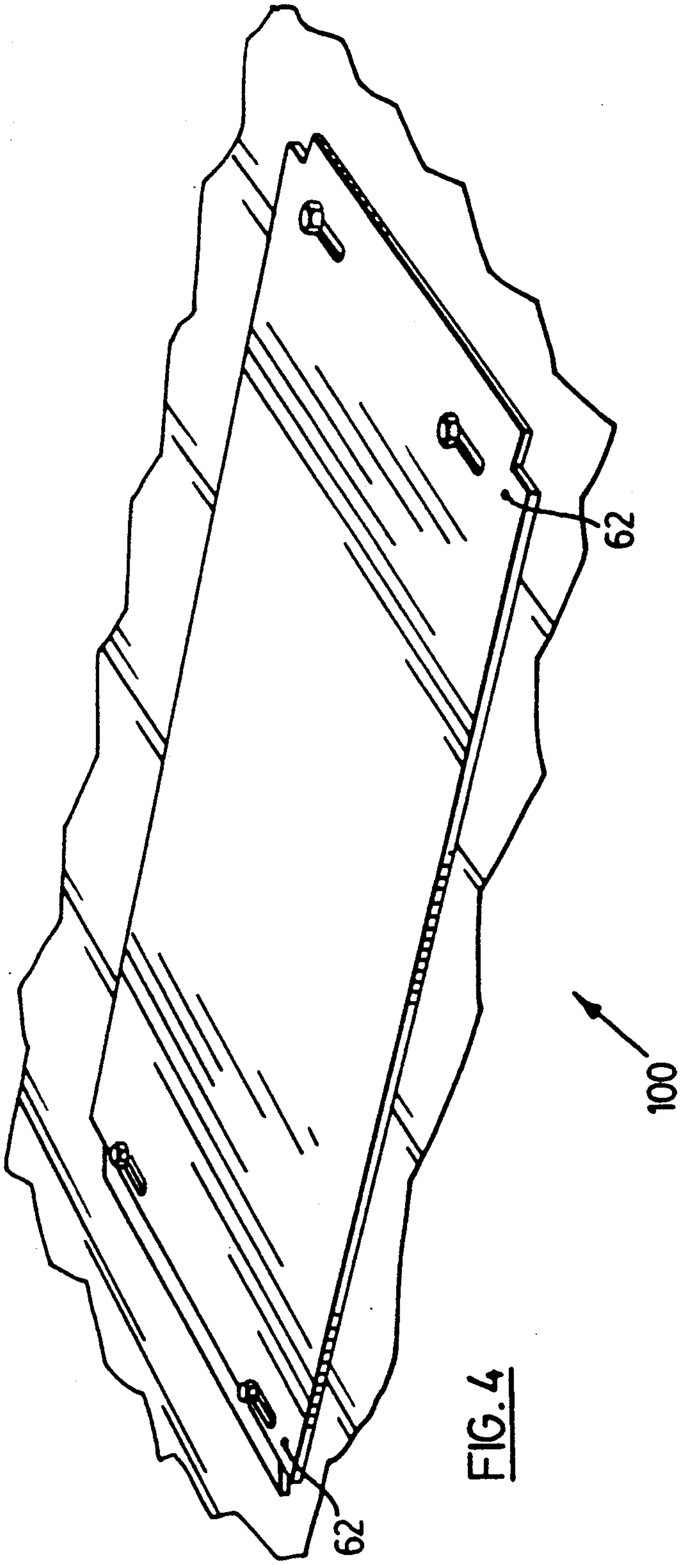
FIG. 4 is a perspective view of a variant embodiment of the plate of the present invention incorporating a base member.

As shown in FIG. 4, there are two small holes 62, for locking purposes, as described below. Corresponding holes 62 are provided in the embodiments of FIGS. 1, 2 and 3. The holes 62 are outside of the cage 52.

Figure 2:
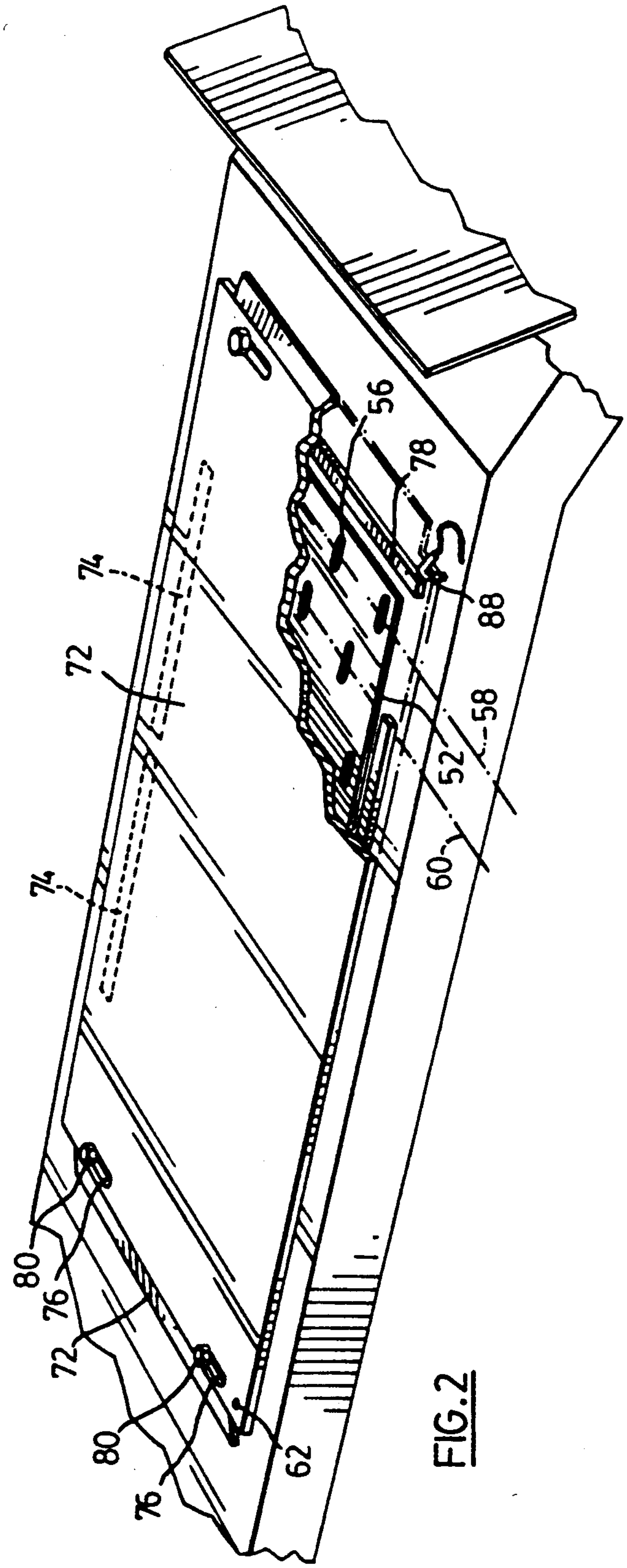
FIG. 2 is a perspective view of one rear plate in accordance with the present invention in partial section.

Referring now to FIGS. 1, 2 and 3, the top sheet member 54 is formed from a generally rectangular sheet. The sheet is cut away at the corners 70 to leave edge strips 72. As shown in the sectional view of FIG. 3, the edge strips 72 are inclined downwards by approximately half the diameter of the ball bearings used. Along either side, there are two edge bars 74 on each side, located close to the side edge strip 72. At each of the front and rear, there is a pair of elongate openings 76. Each of these openings is generally rectangular with a rounded end. Set in from each pair of front and rear opening 76 is respective front or rear edge bar 78.

Each of the bars 74, 78 has a thickness corresponding to the displacement of the edge strip 72, which thickness is approximately half the diameter of the ball bearings used. The edge bars 74, 78 are generally identical, for convenience of manufacture, and are welded at appropriate places. The edge bars 74, 78 are so located as to define an unobstructed inner rectangular area whose length and width are substantially greater than the length and width of the bearing cage 52, to provide for free movement of the alignment plate 50 as a whole, as detailed below.

As shown in the sectional view of FIG. 3, the top sheet member 54 is located on the ball bearings within the bearing cage 52. It is located in position by bolts 80 located in the opening 76 and secured by known manner in holes 82 in the respective support platform 8. The bolts 80 are shoulder bolts, so that they can be full tightened, whilst not providing a clamping action on the top sheet 54.

The top sheet 54 is supported on ball bearings 90 located in the apertures 56 of the bearing cage 52. The edge strips 72 serve to both protect the ball bearings 90 and bearing cage 52 and also provide a smooth approach to the whole alignment plate 50, so that a vehicle wheel can easily climb up onto it. The edge bars 74, 78 also serve to provide an element of protection for the bearings 90 and bearing cage 52. The bolts 80 and elongate opening 76 are such as to provide for certain limited movement of the top sheet 54. Thus, the top sheet 54 is free to be moved transversely. Also, sheet 54 can undergo a certain amount of limited rotational movement about a vertical axis.

As the top sheet 54 moves, the ball bearings 90 correspondingly roll and the bearing cage 52 is moved. In general, in known manner, the movement of the bearing cage 52 will be half that of the top sheet 54. Thus, the clearance provided between the bars 74, 78 and the bearing cage 52 need only allow for approximately half the movement that the top sheet member 54 can undergo, as limited by the bolts 80.

To secure the alignment plate 50 in position, either when the lift 1 is not being used, or wheel alignment is not being carried out, the locking pin holes 62 at either end of the sheet member 54 are used. Corresponding locking pin holes are provided in the support platform 8. Locking pins 88 are attached to the support platform 8 by short cords or chains and are dimensioned for fitting in the locking pin holes 62. With the locking pins 88 so located, the rear wheel alignment plate 50 cannot be moved.

In use, the lift 1 would first be moved to a lowermost position, if not already in that position. The vehicle would then be driven onto the lift 1, so that its front wheels rest on the front alignment plates 20 and its rear wheels rest on the rear alignment plates 50. It is here noted that the length of the rear wheel alignment plates 50 is selected so as to allow for the different wheel bases of most vehicles that the operator would encounter. At this time, the locking pins 44 and 88 for the front and rear plates are in position, to lock the plates in a neutral or zero position. The lift 1 is then raised to a convenient working height.

To adjust the alignment of the front wheels, the pins 44 are removed, and the usual alignment procedure carried out.

For the rear wheels, the locking pins 88 are removed, so as to free the top sheet members 54 for both lateral and rotational movement. Either all the locking pins 88 can be removed together, or to prevent sideways movement of the whole of the rear of the vehicle, just the locking pins 88 on one side would be removed. Then, the alignment of each rear wheel is checked. The camber and toe in as well as other parameters of each rear wheel can then be freely adjusted. The rear wheel alignment plates 50 permit the rear wheels to move as required in response to the alignment adjustments. With the alignment completed, the locking pins 44, 88 would be reinserted where possible. The lift 1 would be lowered and the vehicle then driven off the lift 1. It may not be possible to reinsert all the locking pins 88, since the adjustment of the wheels may have moved the alignment plates away from their neutral positions. Hence, after the vehicle has left the lift 1, the locking pins 44, 88 can be replaced.

Reference will now be made to FIG. 4 which shows a variant embodiment of the present invention. This embodiment is generally similar to the first embodiment, and like parts are given same reference. This second embodiment is designated by the reference 100. This alignment plate 100 is intended for separate use on the floor of a workshop, i.e. independently of any lifting device. For this purpose, it includes a base sheet member 102, which would be secured in position. Thus, the bearings 90 and top sheet member 54 are supported on this base sheet member 102, similar to the manner in which they are supported on the support platform 8 in the first embodiment. The base sheet member 102 includes a locking pin opening, so again the top sheet member 54 can be secured in a neutral position by locking pins 88.

With regard to preferred dimensions, which would have the appropriate tolerances, the bearing cage 52 could be 58 inches long by 18 inches wide. It would have a thickness of 3/16 of an inch, for use with balls having a diameter of $\frac{1}{4}$ of an inch. As shown, there are 45 apertures 56, and each holds 5 ball bearings 90, this gives a total of 225 ball bearings. The bearing cage 52 is moulded from ultra high molecular weight plastic.

The top sheet member 54 is made from $\frac{1}{4}$ inch steel plate, with the edge strips 72 displaced downwardly at their edge by $\frac{1}{8}$ of an inch. The flat bars are typically cut from strip which has a width of 1 inch and a thickness of $\frac{1}{8}$ of an inch. Each edge bar 74, 78 is 20 inches long. The inner rectangular opening within the edge bars 74, 78 has a width of 19 and $\frac{3}{4}$ inches and a length of 58 and $\frac{1}{2}$ inches. The elongate openings 76 have a width of 1 inch and an overall length of 4 inches. The shoulder portions of the locking bolts have a diameter of half an inch and are $\frac{5}{8}$ of an inch long, to give a comfortable clearance over the thickness of the sheet member 54 and ball bearings 90.

I claim:

1. A plate, for use in adjusting the rear wheels of a four wheel vehicle incorporating all wheel steering, the plate comprising an elongate sheet-form bearing cage, including a plurality of apertures which are spaced apart both along the length and across the width of the bearing cage, a plurality of rolling elements for said apertures, with each aperture including at least one rolling element and the rolling elements having a diameter greater than the thickness of the bearing cage, a top sheet member located on top of the rolling elements for supporting a vehicle wheel, and means for securing the sheet member to a generally horizontal planar surface whilst permitting restricted horizontal movement thereof, which means comprises a plurality of elongate openings in the sheet member and for each opening, a securing member adapted to be secured to a horizontal planar surface and having a shoulder portion whose length is longer than the diameter of the balls and the thickness of the top sheet member and which in use extends up from the horizontal surface, the width of the openings being greater than the diameter of the shoulder portion of the bolts and being of sufficient length and orientation to permit both lateral and rotational movement of the top sheet member, the securing members further including heads larger than the openings to secure the top sheet member, whereby, in use, with the sheet member so secured to a planar surface, the sheet member is supported on the planar surface by said rolling elements and is capable of limited lateral and rotational movement in a horizontal plane.

2. A plate as claimed in claim 1, where both of the bearing cage and the top sheet member are substantially rectangular.

3. A plate as claimed in claim 2, wherein the securing members comprise shoulder bolts, adapted to engage threaded bores in the horizontal planar surface.

4. A plate as claimed in claim 3, wherein the top sheet member includes a plurality of elongate edge bars secured to the underside thereof and defining an area for the bearing cage and being sufficiently spaced from the bearing cage to permit movement thereof.

5. A plate as claimed in claim 4, wherein the top sheet member includes a pair of elongate openings extending transversely at the front thereof and a pair of elongate openings extending transversely at the rear thereof, and which includes edge bars along the sides, front and rear thereof with the front and rear edge bars spaced inwardly from the elongate openings.

6. A plate as claimed in claim 5, wherein the top sheet member includes a pair of edge bars along either edge thereof, a single edge bar at the front thereof, and a single edge bar at the rear thereof.

7. A plate as claimed in claim 4, wherein edges of the top sheet member are inclined downwardly by an amount less than the diameter of the rolling elements.

8. A plate as claimed in claim 5, wherein edges of the top sheet member are inclined downwardly by an amount less than the diameter of the rolling elements.

9. A plate as claimed in claim 7 or 8, wherein corners of the plate, between the inclined edges are cut away.

10. A plate as claimed in claim 2, 3, or 7, wherein the apertures in the bearing cage are arranged in a plurality of rows extending transversely of the bearing cage and uniformly spaced apart in a longitudinal direction, each row including a plurality of apertures.

11. A plate as claimed in claim 7, wherein the apertures are arranged in a plurality of transverse rows, which comprise a first set of transverse rows, each of which includes a plurality of uniformly spaced apertures and one aperture adjacent one side edge of the bearing cage, and a second set of transverse rows, each of which includes a plurality of apertures and one aperture adjacent another side edge of the bearing cage, the transverse rows being uniformly spaced apart in a longitudinal direction and the first and second sets of transverse rows alternating with one another.

12. A plate as claimed in claim 11, wherein the rows of apertures are uniformly spaced from one another except for two rows adjacent the front edge of the plate, whose spacing is approximately half the spacing of the other rows.

13. A plate as claimed in claim 7, wherein the apertures are arranged in a pattern that is asymmetrical about longitudinal and transverse axes of the bearing cage, whereby the relative location of at least a majority of the rolling elements can be altered by turning the bearing cage about at least one of the longitudinal and transverse axes.

14. A plate as claimed in claim 3, 11 or 12, wherein the rolling elements comprise ball bearings.

15. A plate as claimed in claim 7, 11 or 12, wherein the rolling elements comprise ball bearings and wherein each aperture is elongate with rounded ends, and contains five ball bearings.

16. A plate as claimed in claim 3, 7 or 11, which includes locking pin holes at either end thereof and a pair of locking pins, for insertion through the locking pin holes and for engagement with corresponding locking pin holes in said horizontal planar surface.

17. A plate as claimed in claim 3, 7 or 11, in combination with a vehicle lift, the plate being mounted on a support platform of the vehicle lift, which support platform provides the horizontal planar surface for the ball bearings.

18. A plate as claimed in claim 3, 7 or 11, in combination with a vehicle lift and a front wheel alignment plate, wherein the plate for rear wheel adjustment is mounted at the rear of the support platform of the lift with the support platform providing the horizontal planar surface for the ball bearings, and the front adjustment plate is mounted at the front of the support platform, the front adjustment plate including a generally circular top sheet member which is mounted for rotational movement about a vertical axes and for limited lateral movement.

19. A plate as claimed in claim 3, 7 or 11, which is adapted for separate, free-standing use, and which includes a base sheet member, which provides the planar surface for the ball bearings.

* * * * *